United States Patent
Lin

(10) Patent No.: US 10,337,548 B2
(45) Date of Patent: Jul. 2, 2019

(54) CRACK-PROOF SCREW

(71) Applicant: KWANTEX RESEARCH INC., Tainan (TW)

(72) Inventor: Chao-Wei Lin, Tainan (TW)

(73) Assignee: Kwantex Research Inc., Tainan (TW)

( * ) Notice: Subject to any disclaimer, the term of this patent is extended or adjusted under 35 U.S.C. 154(b) by 199 days.

(21) Appl. No.: 15/466,370

(22) Filed: Mar. 22, 2017

(65) Prior Publication Data

US 2018/0135681 A1 May 17, 2018

(30) Foreign Application Priority Data

Nov. 15, 2016 (TW) .............................. 105137180 A

(51) Int. Cl.
| | |
|---|---|
| *F16B 25/00* | (2006.01) |
| *B21H 3/02* | (2006.01) |
| *B21H 3/06* | (2006.01) |

(52) U.S. Cl.
CPC ......... *F16B 25/0036* (2013.01); *B21H 3/022* (2013.01); *B21H 3/06* (2013.01); *F16B 25/00* (2013.01); *F16B 25/0015* (2013.01); *F16B 25/0078* (2013.01)

(58) Field of Classification Search
CPC .............. F16B 25/0015; F16B 25/0036; F16B 25/0052; F16B 25/0078; F16B 25/103; F16B 35/06; F16B 25/00; B21H 3/022; B21H 3/06
USPC .......... 411/386, 387.7, 387.8, 411, 417, 421; 470/9
See application file for complete search history.

(56) References Cited

U.S. PATENT DOCUMENTS

| | | | | | |
|---|---|---|---|---|---|
| 45,133 | A | * | 11/1864 | Bonwill | ............... F16B 25/0015 411/421 |
| 877,131 | A | * | 1/1908 | Searelle | ................... F16B 35/06 411/399 |
| 4,697,969 | A | * | 10/1987 | Sparkes | .............. F16B 25/0015 411/387.7 |
| 5,759,003 | A | * | 6/1998 | Greenway | ........... F16B 25/0015 411/399 |
| 6,789,991 | B2 | * | 9/2004 | Hsu | ...................... F16B 25/0031 411/311 |
| 2007/0269288 | A1 | * | 11/2007 | Palm | .................... F16B 25/0021 411/386 |
| 2013/0324270 | A1 | * | 12/2013 | Wu | ............................ B21H 3/06 470/9 |
| 2017/0045075 | A1 | * | 2/2017 | Hsu | ...................... F16B 25/0052 |

FOREIGN PATENT DOCUMENTS

| TW | 201013060 A | 9/2013 |
|---|---|---|
| TW | M460950 U | 9/2013 |

* cited by examiner

*Primary Examiner* — Roberta S Delisle
(74) *Attorney, Agent, or Firm* — Muncy, Geissler, Olds & Lowe, P.C.

(57) ABSTRACT

A crack-proof screw includes a thread formed around a shank. A helical notch continuously and helically extends along the shank and is indented into the shank and the thread. The helical notch is proximal to but spaced apart from a tip of the shank. The notch is trapezoidal in cross section, and has a notch bottom, an open end opening at an outer peripheral surface of the shank oppositely of the notch bottom, and two opposite notch walls extending divergingly from the notch bottom to the open end. The open end is larger in width than the notch bottom. A method of making the screw is also disclosed.

8 Claims, 7 Drawing Sheets

CRACK-PROOF SCREW

CROSS-REFERENCE TO RELATED APPLICATION

This application claims priority to Taiwanese Patent Application No. 105137180, filed on Nov. 15, 2016.

FIELD

The disclosure relates to a screw and a method for manufacturing the screw, and more particularly to a crack-proof screw and a method for manufacturing the crack-proof screw.

BACKGROUND

A conventional screw 1 as shown in FIG. 1 includes a shank 11 with a tapered end, a thread 12 formed around the shank 11, and one chip collection channel 13 extending from the tapered end of the shank 11 for collecting wood chips when the screw penetrates into a wood and produces wood chips. In FIG. 2, the conventional screw 1 has two chip collection channels 13.

Another conventional screw 2 as shown in FIG. 3 includes a shank 21 having a tapered end in a quadrangular pyramid shape, and a thread 22 formed around the shank 21. A plurality of wavy channels 221 are formed at intervals in the thread 22 and extend from the tapered end of the shank 21, so that the tapered end of the shank 21 is advantageous for cutting and penetrating.

However, when the conventional screw 1 or 2 is forced to penetrate into a wood without a preformed hole, because friction between the screw and wood gradually increases, application force has to be increased to enable the screw to smoothly advance into the wood. In addition, because the chip collection channel 13 or the wavy channels 221 is provided only in a section of the screw from the tapered end, when the amount of wood chips in the chip collection channel 13 or the waved channels 221 increases the wood chips may squeeze into the wood causing the wood to split.

Referring to FIG. 4, a self-tapping screw 3 disclosed in Taiwanese Utility Model Patent No. M460950 includes a shank 31, a thread 32 formed around the shank 31, and a chip collection groove 33 indented into the shank 31 and extending from a tapered end to a head of the self-tapping screw 3. The thread 32 includes a plurality of spaced-apart tooth portions 321 disposed around the shank 31. The chip collection groove 33 includes a plurality of indentation portions 331 each of which is disposed between two adjacent ones of the tooth portions 321. While the self-tapping screw 3 may accommodate an increased amount of wood chips through the indentation portions 331 of the chip collection groove 33, the increased wood chips are unable to be discharged outwardly from the chip collection groove 33.

Referring to FIG. 5, a self-tapping screw 4 disclosed in Taiwanese Invention Patent No. 201013060 includes a shank 41, a thread 42, and a cutting groove 43 helically indented into the shank 41 and the thread 42. When the self-tapping screw 4 advances into a wood, the cutting groove 43 can discharge the wood chips outwardly from the wood. However, the cutting groove 43 is arcuated in cross section. During forming the thread 42 and the cutting groove 43, because the arcuated cutting groove 43 may be unable to mesh with a thread forming die, a positional deviation may occur between the cutting groove 43 and the thread forming die lowering the quality of forming the thread 42.

SUMMARY

Therefore, one object of the disclosure is to provide a crack-proof screw that is able to prevent expansion of a screw hole in wood and alleviate the drawbacks of the prior arts.

According to one aspect of the disclosure, a crack-proof screw includes a head, a shank, a thread and a helical notch.

The shank axially extends from the head, and has a tip.

The thread is formed continuously and helically around the shank.

The helical notch continuously and helically extends along the shank and is indented into the shank and the thread. The helical notch is proximal to but spaced apart from the tip. The notch is trapezoidal in cross section, and has a notch bottom, an open end opening at an outer peripheral surface of the shank oppositely of the notch bottom, and two opposite notch walls extending divergingly from the notch bottom to the open end. The open end is larger in width than the notch bottom.

Another object of the disclosure is to provide a method for manufacturing a crack-proof screw.

According to another aspect of the disclosure, a method for manufacturing a crack-proof screw includes:

cutting a rod metal material with a predetermined length into a shank, and punching an end of the shank into a head; and thread rolling by using a die assembly to form a thread that extends continuously and helically around the shank, and a helical notch extending continuously and helically along the shank and indented into the shank and the thread, the helical notch being proximal to but spaced apart from a tip of the shank, the helical notch being trapezoidal in cross section, and having a notch bottom, an open end opening at an outer peripheral surface of the shank oppositely of the notch bottom, and two opposite notch walls that extend divergingly from the notch bottom to the open end, the open end being larger in width than the notch bottom.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
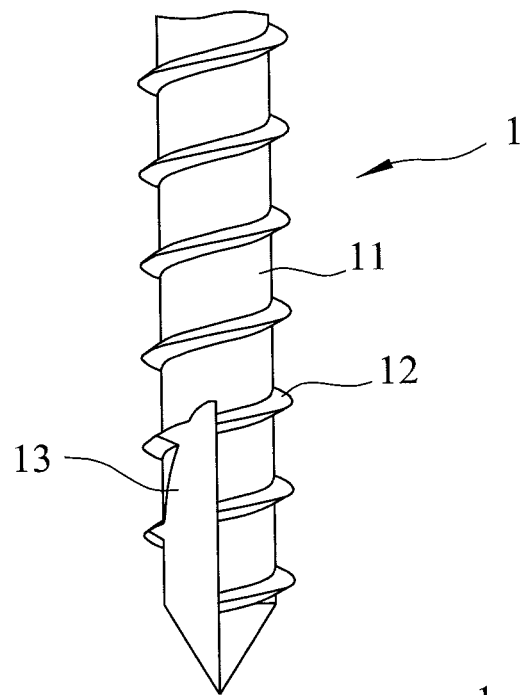
FIG. 1 is a fragmentary view of a conventional screw with one chip collection channel.
Figure 2:
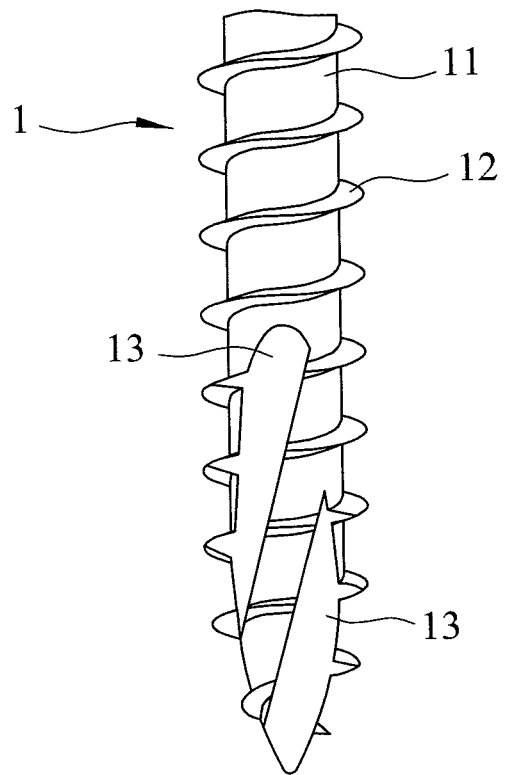
FIG. 2 is a fragmentary view of a conventional screw with two chip collection channels.
Figure 3:
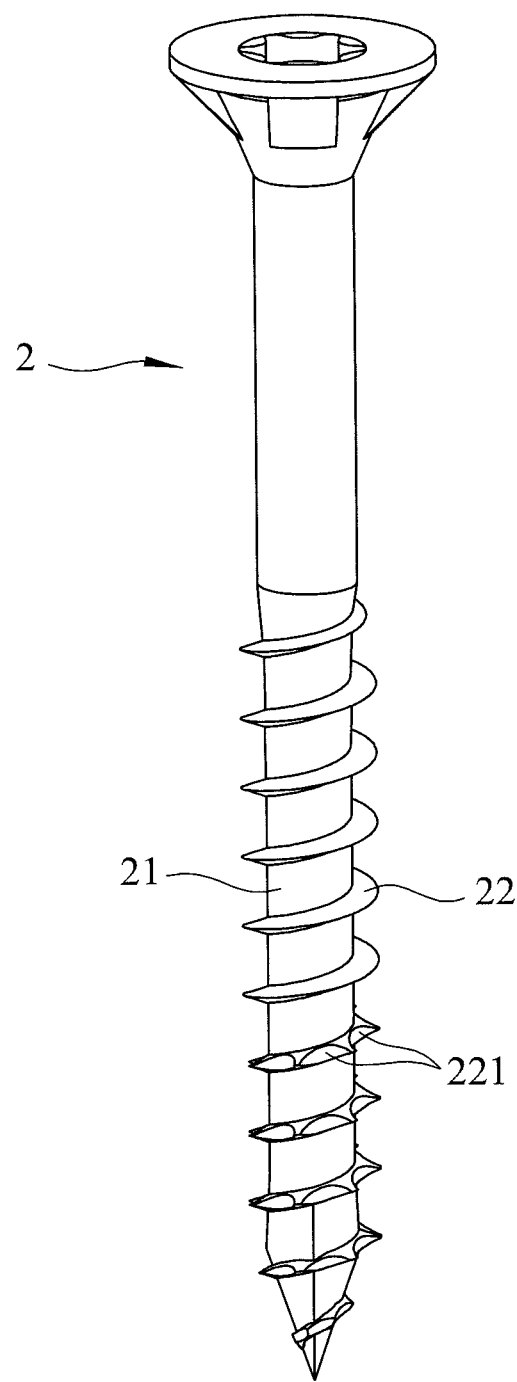
FIG. 3 is a perspective view of another conventional screw.
Figure 4:
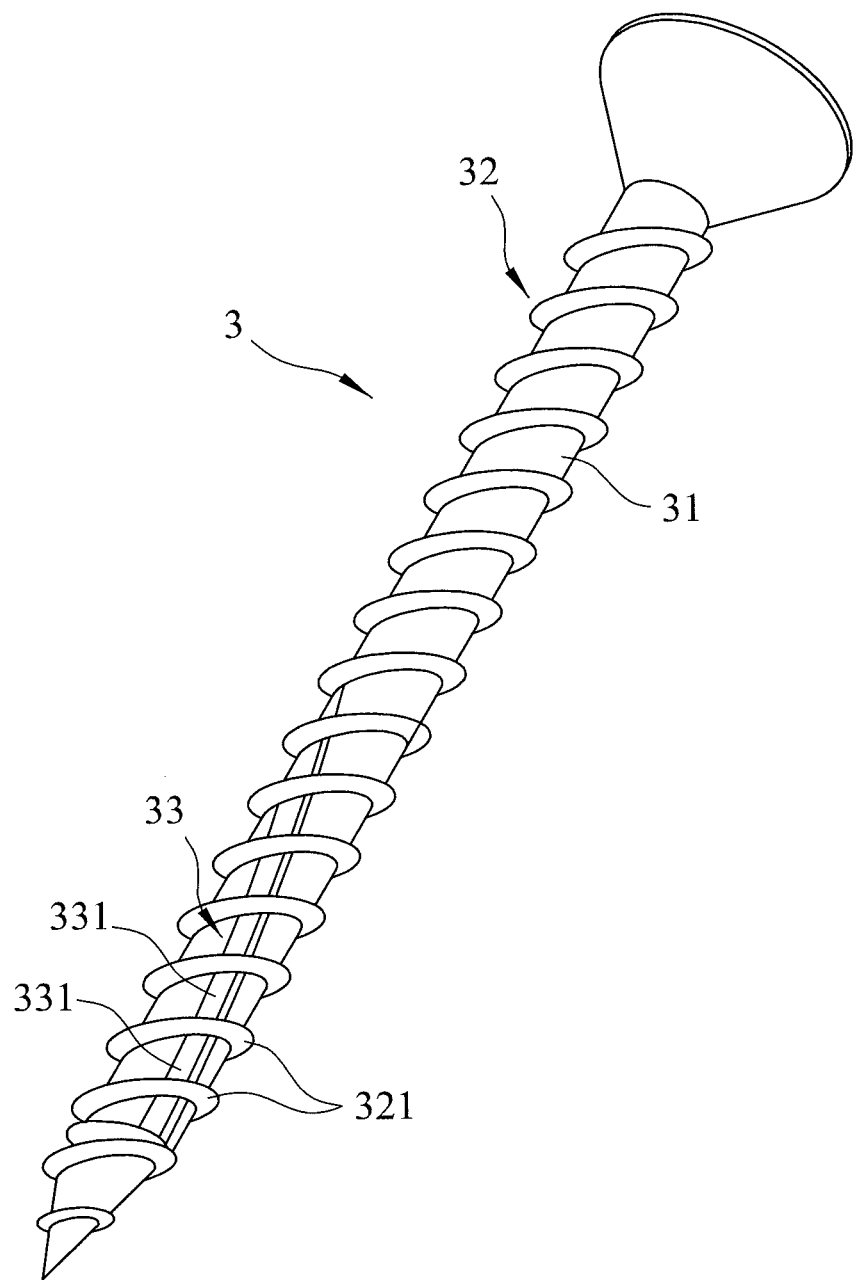
FIG. 4 is a perspective view of a self-tapping screw disclosed in Taiwanese Utility Model Patent No. M460950.
Figure 5:
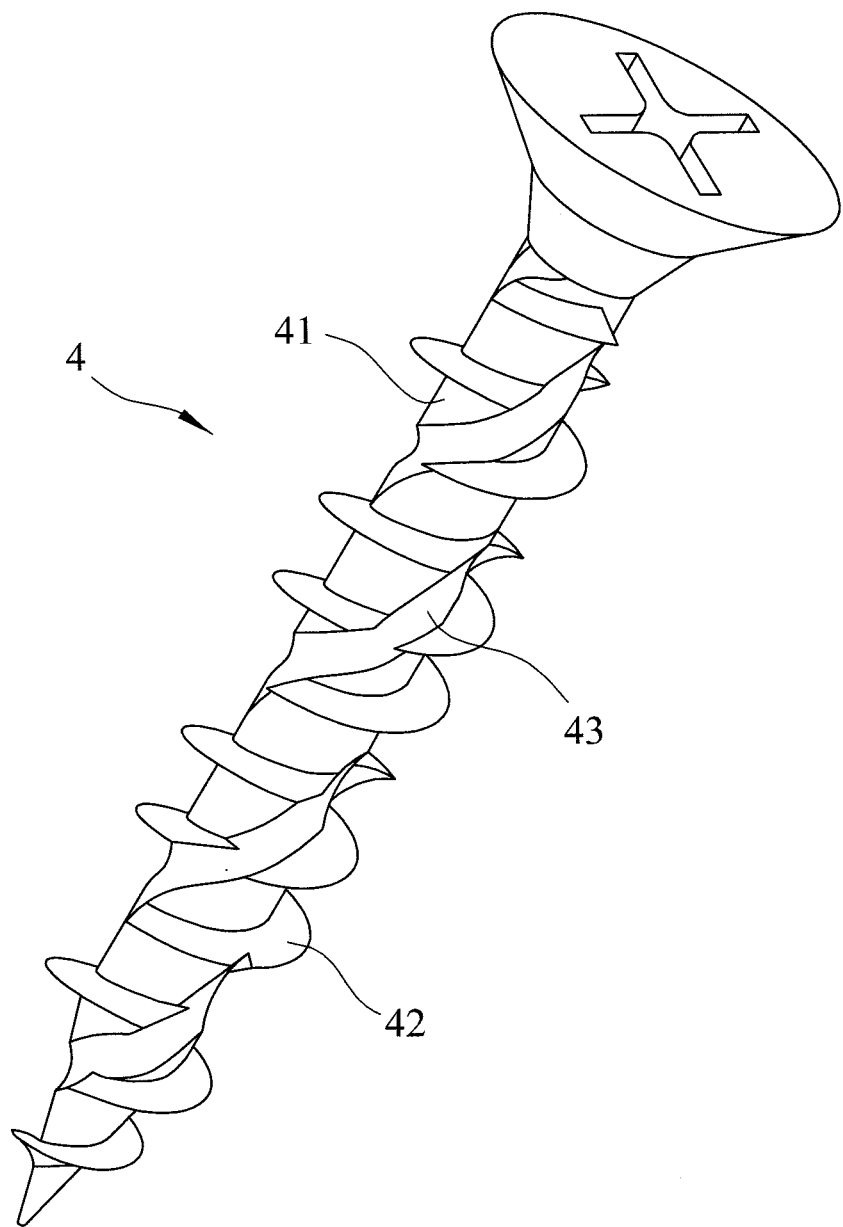
FIG. 5 is a perspective view of a self-tapping screw disclosed in Taiwanese Invention Patent No. 201013060.
Figure 6:
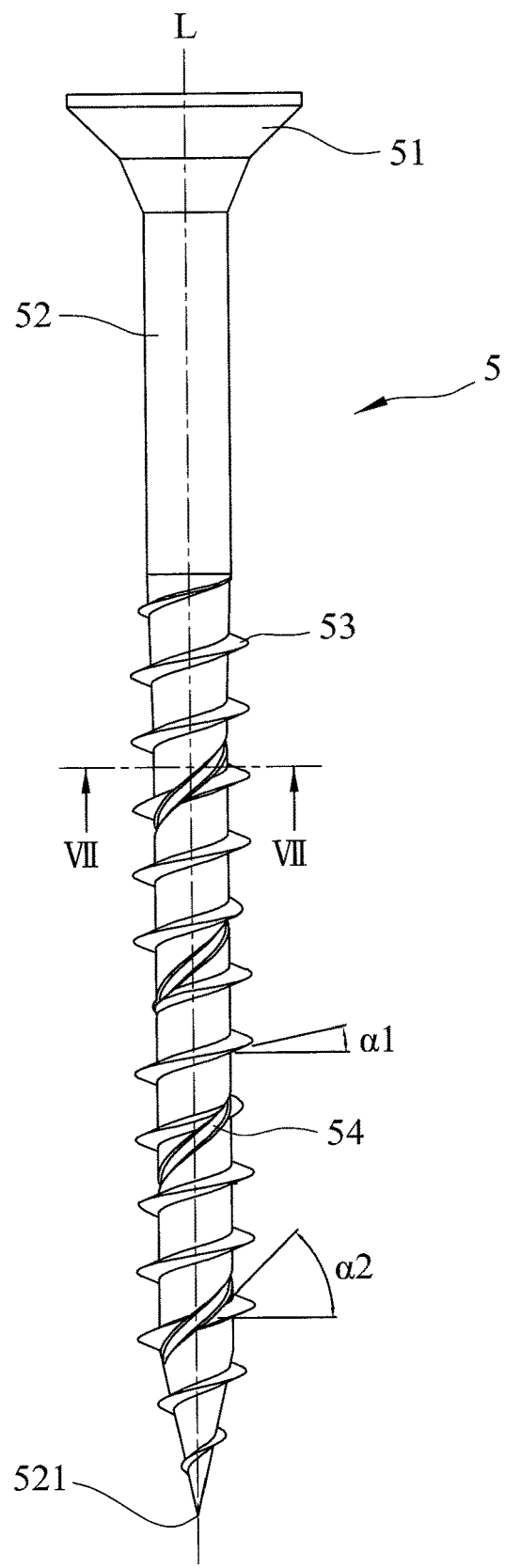
FIG. 6 is a front view of a crack-proof screw according to an embodiment of the present disclosure.

Referring to FIG. 6, a crack-proof screw 5 according to an embodiment of the present disclosure includes a head 51, a shank 52, a thread 53 and a helical notch 54. The shank 52 axially extends from the head 51, and has a tip 521. The thread 53 is formed continuously and helically around the shank 52. The helical notch 54 continuously and helically extends along the shank 52 and is indented into the shank 52 and the thread 53. The helical notch 54 is proximal to but spaced apart from the tip 521. In addition, the helical notch 54 has a length equal to at least half of a length of the thread 53, and has a lead angle ($\alpha 2$) greater than a lead angle ($\alpha 1$) of the thread 53.

Figure 7:
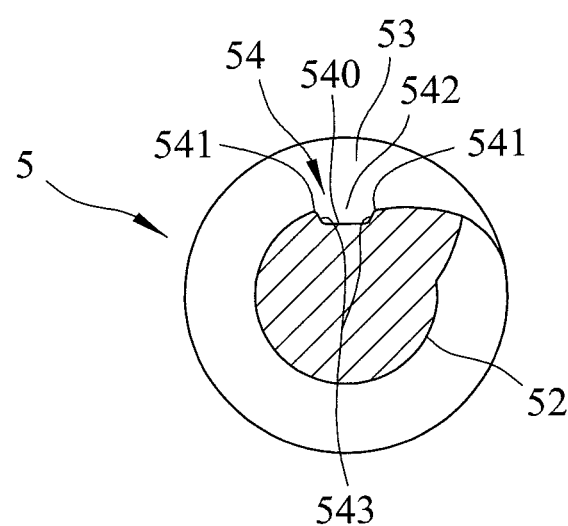
FIG. 7 is a sectional view of the embodiment.

Referring to FIG. 7, in combination with FIG. 6, the helical notch 54 is trapezoidal in cross section, and has a notch bottom 540, an open end 542 opening at an outer peripheral surface of the shank 52 oppositely of the notch bottom 540, and two opposite notch walls 543 extending divergingly from the notch bottom 540 to the open end 542. The open end 542 is larger in width than the notch bottom 540. Each of the notch walls 543 forms a cutting edge 541 at the open end 542. The cutting edges 541 of the notch walls 543 intersect noncontinuously the thread 53 to enhance cutting and anchoring effects.

Figure 8:
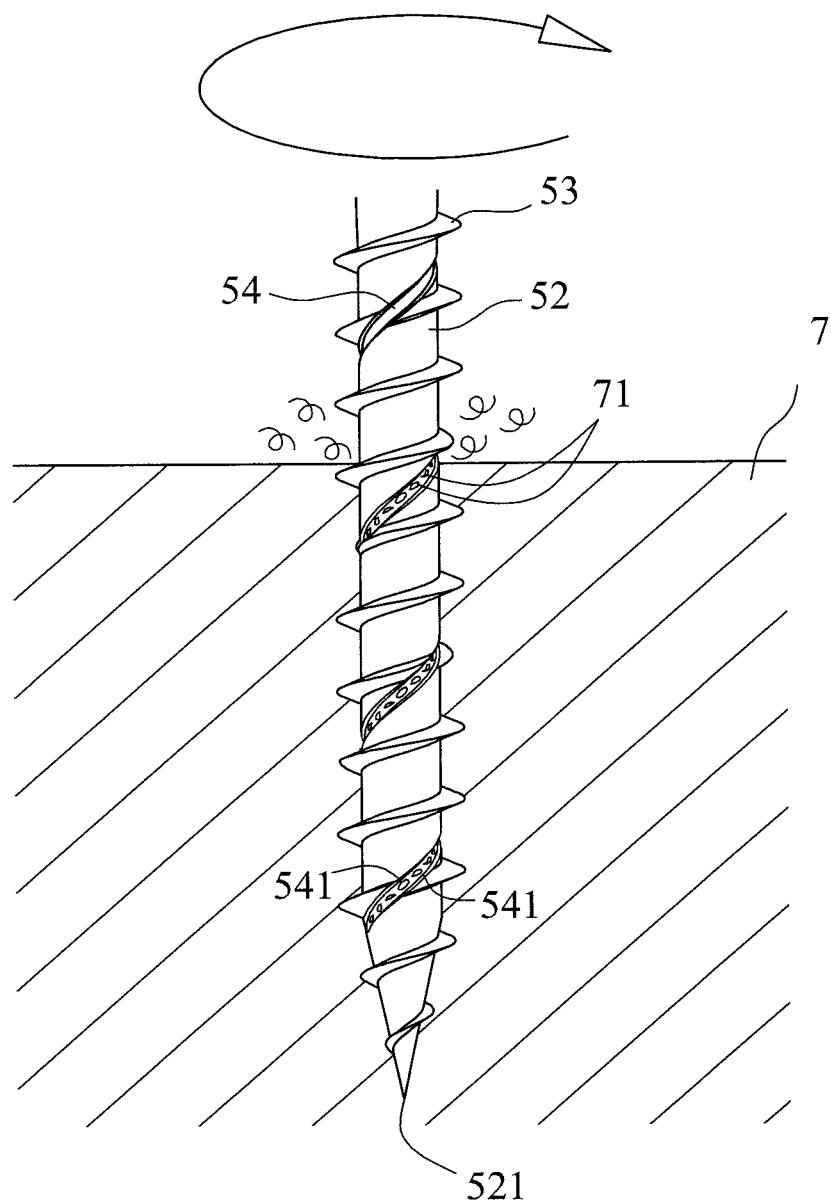
FIG. 8 is fragmentary sectional view, illustrating the crack-proof screw of the embodiment advanced into a wood.

Referring to FIG. 8, when the crack-proof screw 5 is driven into a wood 7, the thread 53 is guided to penetrate into the wood 7 and the cutting edges 541 cut into and remove wood chips 71 of the wood 7. Meanwhile, the helical notch 54 discharges the wood chips 71 outwardly from the wood 7. By virtue of the configuration of the helical notch 54, the crack-proof screw 5 may collect and discharge the wood chips 71 produced during the screwing process. Therefore, the crack-proof screw 5 may be easily advanced into the wood 7 with a constant driving force, thereby considerably reducing the torque required for driving the crack-proof screw 5 into the wood 7. The total driving torque may be stably and slowly accumulated, and the effect of saving energy may be apparently increased. In addition, an incidence of splitting the wood 7 may be avoided. Because the penetration of the thread 53 into the wood 7 does not cause expansion of the screw hole, the pull-out strength of the crack-proof screw is not reduced. The structural strength of the wood 7 can thus be maintained. In sum, aside from improving the efficiency of the screwing operation, the crack-proof screw 5 may increase the structural safeness, and solve the global problems encountered in the exiting industries as to how to achieve a high ratio of energy saving and a safe pullout strength, and how to prevent wood cracking.

A method for manufacturing a crack-proof screw according to the present disclosure may be performed as follows. A rod metal material is cut with a predetermined length into a shank 52, and is subjected to punching to form an end of the shank 52 into a head 51. Thread rolling is performed by using a die assembly to form a thread 53 that extends continuously and helically around the shank 52, and a helical notch 54 that extends continuously and helically along the shank 52 and indented into the shank 52 and the thread 53. The helical notch 54 is proximal to but spaced apart from a tip 521 of the shank 52. The helical notch 54 is trapezoidal in cross section, and has a notch bottom 540, an open end 542 opening at an outer peripheral surface of the shank 52 oppositely of the notch bottom 540, and two opposite notch walls 543 that extend divergingly from the notch bottom 540 to the open end 542. The open end 542 is larger in width than the notch bottom 540. Specifically, for forming the trapezoidal cross section of the helical notch 54 and the open end 542 wider than the notch bottom 540, a die block of the die assembly is moved slowly for rolling the thread at a speed that is lower than a speed conventionally used in an existing thread rolling process by an amount of 25% to 35%. The purpose of the speed reduction is to assuredly intermesh a metal blank for the shank 52 and the die assembly so that positional deviation between the metal blank and the die assembly may be avoided and a proper configuration may be completed. For forming the crack-proof screw 5, the die assembly has a prolong length through which the number of revolutions that the metal blank revolves over the die assembly to form the thread 53 is increased by an amount of 40% to 60% compared to the number of revolutions allowed by the conventional die assembly to complete formation of a screw.

Because the thread 53 and the helical notch 54 are simultaneously formed at one time, it is unnecessary to use an additional process for forming the helical notch 54, thereby saving processing costs.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A crack-proof wood screw capable of self-tapping into wood, comprising:
   a head;
   a shank axially extending from said head, and having a sharp conical tip;
   a thread formed continuously and helically around said shank; and
   a helical notch continuously and helically extending along said shank and indented into said shank and said thread, said helical notch being proximal to but spaced apart from said tip, said helical notch being trapezoidal in cross section, and having a notch bottom, an open end opening at an outer peripheral surface of said shank oppositely of said notch bottom, and two opposite notch walls extending divergingly from said notch bottom to said open end, said open end being larger in width than said notch bottom.

2. The crack-proof wood screw as claimed in claim 1, wherein said helical notch has a length equal to at least half of a length of said thread.

3. The crack-proof wood screw as claimed in claim 1, wherein said helical notch has a lead angle greater than a lead angle of said thread.

4. The crack-proof wood screw as claimed in claim 1, wherein each of said notch walls forms a cutting edge at said open end.

5. A method for manufacturing a crack-proof wood screw, comprising:

cutting a rod metal material with a predetermined length into a shank, and punching an end of the shank into a head, and thread rolling the shank by using a die assembly to form a thread that extends continuously and helically around the shank, and a helical notch that extends continuously and helically along the shank and indented into the shank and the thread, the helical notch being proximal to but spaced apart from a tip of the shank, the helical notch being trapezoidal in cross section, and having a notch bottom, an open end opening at an outer peripheral surface of the shank oppositely of the notch bottom, and two opposite notch walls that extend divergingly from the notch bottom to the open end, the open end being larger in width than the notch bottom, wherein the die assembly has a prolong length through which the number of revolutions that the shank revolves over the die assembly to form the thread is increased by an amount of 40% to 60% compared to the number of revolutions allowed by a conventional die assembly to complete formation of a screw.

6. The method for manufacturing a crack-proof wood screw as claimed in claim 5, wherein the helical notch has a length equal to at least half of a length of the thread.

7. The method for manufacturing a crack-proof wood screw as claimed in claim 5, wherein the helical notch has a lead angle greater than a lead angle of the thread.

8. The method for manufacturing a crack-proof wood screw as claimed in claim 5, wherein each of the notch side walls has a cutting edge at the open end.

* * * * *